US006881440B2

(12) United States Patent
Caroline et al.

(10) Patent No.: US 6,881,440 B2
(45) Date of Patent: *Apr. 19, 2005

(54) METHOD AND MATERIALS FOR SURFACE PROTECTION

(75) Inventors: Brad Caroline, Livermore, CA (US); Craig Puderbach, Newport, OR (US)

(73) Assignee: Armor Kote, LLC, Park City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/809,255

(22) Filed: Mar. 25, 2004

(65) Prior Publication Data

US 2004/0197477 A1 Oct. 7, 2004

Related U.S. Application Data

(63) Continuation-in-part of application No. 10/603,882, filed on Jun. 25, 2003, now Pat. No. 6,767,580, which is a continuation-in-part of application No. 09/747,222, filed on Dec. 26, 2000, now Pat. No. 6,623,805.

(51) Int. Cl.$^7$ .............................. B05D 1/02; B05D 1/36; B05D 5/08; B05D 7/26
(52) U.S. Cl. ..................... 427/154; 427/204; 427/282; 427/407.1; 427/422; 427/426
(58) Field of Search ................................ 427/154, 155, 427/156, 256, 258, 259, 269, 287, 402, 407.1, 421, 422, 426, 282, 180, 202, 204; 4/DIG. 18, 580, 584, 612, 613; 106/600, 610, 622, 287.34, 634

(56) References Cited

U.S. PATENT DOCUMENTS 5,851,618 A * 12/1998 Liddell et al. ............. 428/41.8

* cited by examiner

Primary Examiner—Shrive P. Beck
Assistant Examiner—William Phillip Fletcher, III
(74) Attorney, Agent, or Firm—Charles L. Thoeming

(57) ABSTRACT

The present invention relates to an improved protective composition and method. The preferred protective composition uses near equal amounts by weight or volume of a pre-polymer and curative; however up to three to one amounts of pre-polymer to curative are consistent with the composition and method of the invention. The mixture is applied by a portable spray apparatus using a mixing spray nozzle. For temporary protective coatings using the present invention a releasing agent is applied to the surface to be sealed. The present invention is ideally suited to protect bath tubs, whirlpools, shower stalls, shower pans, tile, marble, glass, metal, hardwoods, other smooth, non-porous surfaces, and the like. The resulting protective coat from the present invention is impenetrable to ladders, boots, sheet rock, mud, paint, dirt, metal pieces, rocks, gravel, sand, grime which might accompany work on or around the protected surface. The present invention also provides a means to avoid scratching, nicking, marring, chipping, staining, painting, and abrading from these and a multitude of other external forces or objects. As a permanent coating, the present invention can guard against weather, water, sun damage, wind damage, or provide attributes specifically needed on certain surfaces such as improved traction for wet or water-exposed surfaces.

20 Claims, No Drawings

METHOD AND MATERIALS FOR SURFACE PROTECTION

CROSS-REFERENCES TO RELATED APPLICATIONS

This application is a continuation-in-part of the inventors' previously filed United States non-provisional application, Ser. No. 10/603,882, filed Jun. 25, 2003, which issued as U.S. Pat. No. 6,767,580 B2 on Jul. 27, 2004, and which is a continuation-in-part of the inventors' previously filed United States non-provisional application, Ser. No. 09/747,222 filed Dec. 26, 2000, which was published on June 27, 2002 as U.S. Pat. No. 2002/0081383 Al, and which issued as U.S. Pat. No. 6,623,805 B2 on Sep. 23, 2003.

STATEMENT REGARDING FEDERALLY SPONSORED RESEARCH OR DEVELOPMENT

None.

REFERENCE TO MICROFICHE APPENDIX

None.

BACKGROUND OF THE INVENTION

1. Field of the Invention

The invention relates to sealing products and improved methods of application to provide an impenetrable and either permanent or quickly and easily removable durable, protective coating for a variety of surfaces or uses.

2. Description of the Related Art Including Information Disclosed under 37 C.F.R. 1.97 and 1.98

A search of the prior art located the following United States patents which are believed to be representative of the present state of the prior art: U.S. Pat. No. 5,851,618, issued December 1998; U.S. Pat. No. 5,193,716, issued March 1993; U.S. Pat. No. 3,657,001, issued December 1972; U.S. Pat. No. 5,372,637, issued December 1994; U.S. Pat. No. 3,846,355, issued November 1974; U.S. Pat. No. 4,396,681, issued August 1983; U.S. Pat. No. 4,511,626, issued April 1985; U.S. Pat. No. 4,461,788, issued July 1984; and G.B. Patent No. 1 306 020, issued February 1973. These references, however, suffer from one or more of the following disadvantages, as more specifically detailed below.

BRIEF SUMMARY OF THE INVENTION

Numerous masking or coating compounds or methods are known in the field of art to seal or otherwise protect surfaces or finishes from undesired contact with processing or construction unrelated to the surfaces or finishes. These known compounds or methods, however, do not adequately protect against penetration by foreign objects contacting or otherwise resting on the sealed surface and which become further forced into the surface by foot-traffic, accidental dropping, or similar external forces related to construction or repair activities taking place proximately to the sealed surface area. The sealed surfaces presented in the prior art are most suitable to temporarily protect against paint overspray, sun damage, weather damage, or similar non-impact invasion. These prior art surfaces, however, lack durability and require time consuming, separate applications and drying times for any associated release agents plus the protective surface for removable applications. The prior art application methods do not use individually portable application means, thus limiting their range and suitability for applications in close quarters.

Also, the prior art require release agents or first barrier coats to be dried before applying the protective coating (see U.S. Pat. No. 5,851,618, column 3, lines 53–59). The prior art is similarly limited to protecting horizontal floor or similarly flat topographies (see, e.g., U.S. Pat. No. 5,851,618, column 3, lines 23–25).

None of the prior art is durable enough for repeated use on identical protective surface topographies.

Some of the prior art teach the use of latex based materials which do not provide suitable protective coatings for the applications using the materials or methods of the present invention.

Therefore, it is an object of the present invention to provide an economical, durable multi-purpose surface coating.

It is another object of the present invention to provide such a surface coating which is also quickly and easily applied to any surface in one application.

Another object of the present invention to provide such a surface coating which is also quickly and easily applied to any surface without requiring drying of any pre-coat or release agent coating.

It is another object of the present invention to provide such a surface coating which can be quickly and easily removed once the activity upon or around the surface, and which activity is being guarded against, has ceased.

It is yet another object of the present invention to provide such a surface coating which can be permanently applied, depending upon the application, to guard against weather, water, sun damage, wind damage, or to provide specific desired benefits such as improved traction for wet surfaces.

Another object of the present invention is to provide a method to allow for portable self-contained applications of such surfaces using apparatus known in the art.

Yet another object of the present invention is to provide such a surface coating which is impenetrable from most activities which would otherwise scrape, chip, gouge, crack, scar, dent, or discolor an unprotected surface.

Yet another object of the present invention is to provide such a surface coating applicable to unfinished or finished surfaces including, but not limited to, porcelain, concrete, metal, stone, tile, glass, plastic, wood, or composite materials, regardless of the vertical or horizontal orientation of the finished surfaces.

Yet another object of the present invention is to provide such a surface coating in order to avoid scratching, nicking, marring, chipping, staining, painting, and abrading unfinished or finished surfaces including, but not limited to, porcelain, concrete, metal, stone, tile, glass, plastic, wood, composite materials, and the like.

It is a further object of the present invention to provide an improved spray on surface coating application which is durable enough to be reused on surfaces presenting identical surface geometries.

These together with other objects of the invention, along with the various features of novelty which characterize the invention, are described with particularity in the claims attached to and forming a part of this disclosure. For a better understanding of the invention, its operating advantages and the specific objects attained by its uses, reference should be made to the descriptive materials in which there are described various preferred embodiments of the invention. Other features, advantages, and objects of the present invention will become apparent with reference to the following description.

BRIEF DESCRIPTION OF DRAWINGS

There are no drawings of the present invention.

DETAILED DESCRIPTION OF THE INVENTION

The detailed description, as set forth below, is intended as a description of the composition and method of the preferred embodiment of the invention, and is not intended to represent the only form in which the present invention may be practiced, constructed or operated. It is to be understood that the invention may be practiced by other different embodiments, which are also encompassed within the spirit and scope of the invention.

The preferred embodiment of this invention provides a method for protecting bath tubs, whirlpools, shower stalls, shower pans, tile, marble, glass, metal, and similar smooth, non-porous surfaces, and the like, during construction work surrounding such surfaces, or for similar protective purposes. This embodiment provides a protective surface coating composition and portable method which can be quickly and easily applied and removed once construction or other activity upon or around the surface, selected to be guarded, has ceased. The removed protective surface coating of the present invention's novel method and materials can be reused for several applications with identical surface geometries. Another embodiment further provides a protective surface coating that is both durable and applied in a portable single spray application after the surface has been treated with a primary sprayed release agent for removable coating applications. Because of the method of application, this novel finished surface protection is equally quickly and easily applied within a few minutes to, as well as quickly and easily removed within seconds from, vertical and horizontal surface topographies.

It has been found through testing and experimentation that for general purposes the preferred coating formulation for the present invention is a 49%–52% mixture by weight or volume of a pre-polymer mixture to correlative percentage of a curative mixture, resulting in a mixture of within 3% equal parts by volume or weight of the two ingredients. The present invention can be practiced with up to a three to one ratio of pre-polymer mixture to correlative percentage of a curative mixture by weight or volume. For the preferred embodiment, this mixing of ingredients is accomplished at the disposable spray nozzle of a portable spray applicator. Such spray applicators are known in the art and provide separate product reservoirs which feed through separate, heated flow lines to the spray nozzle. The heated flow lines allow for the optimal application temperature of the coating material in the temperature range from 20 degrees Fahrenheit to 120 degrees Fahrenheit. This preferred embodiment of the present invention is provided by using a composition of a prepolymer polyurethane from the isocyanate terminated prepolymer family and a curative polyurethane from the hydroxyl terminated polyether polyol chemical family. The preferred embodiment of the present invention uses a blended silicone solution as a releasing agent. These preferred embodiment release agent ingredients provide optimal results when applied to surfaces between ambient temperatures of 20 degrees Fahrenheit and 120 degrees Fahrenheit.

It is a critical feature of the preferred embodiment of the present invention that the application means for the protective coating comprises an adjustable dual pump sprayer further comprising a disposable spray nozzle tip wherein the pre-polymer mixture and the curative mixture are mixed at the disposable spray nozzle tip and atomized by compression to provide a four to five inch spray pattern.

All embodiments of the protective coating of the present invention can be applied using either low pressure, portable spraying systems mounted on manually supported or positioned frames, such as handcarts, backpacks, and the like, or with high pressure spraying systems mounted in a motor vehicle, such as a mini van, and the like. The release agent is applied using a HVLP quart spray gun, or the like, for fine spray atomization of the release agent and even coverage thereof over the protective surface.

The prepolymer polyurethane of the preferred embodiment of the present invention includes a mixture of: from 35% to 75% polymeric diphenylmethane diisocyanate, preferably 70%; from 7% to 35% 4,4-diphenylmethane diisocyanate, preferably 25%; and from 1% to 8% trischloropropyl phosphate, preferably 5%.

The curative polyurethane of the preferred embodiment of the present invention includes a mixture of: from 2% to 76% hydroxl terminated poly (oxyalkylene) polyethers, preferably 74%; from 1% to 17.5% butanediol, preferably 17%; from 1% to 9% diethyltoluenediamine, preferably 8.1%; and from 0.5% to 1% of organotin catalyst, preferably 0.9%.

One possible releasing agent of the preferred embodiment of the present invention includes a mixture of: from 0.5% to 2% Stoddard solvent, preferably 1.5%; 90% aliphatic hydrocarbon; and from 1% to 10% silicone blend, preferably 8.5%. An alternate releasing agent for the preferred embodiment of the present invention includes 90% aliphatic hydrocarbon and 10% silicone blend.

Another embodiment of the present invention uses a composition of a prepolymer polyurethane from the isocyanate chemical family which includes a mixture of: from 0.5% to 1% of toluene diisocyanate, preferably 0.5%; from 20% to 67% isocyanate terminated prepolymer, preferably 45%; from 4% to 10% diphenylmethane diisocyanate, preferably 7%; from 2% to 4.5% higher oligomers of MDI, preferably 2%; from 1% to 13% parafinic and naphthenic petroleum blend, preferably 5%; from 16% to 58% chlorinated hydrocarbon, preferably 38%; and from 2% to 3% hydrophobic silica, preferably 2.5%. This embodiment of the present invention uses a composition of a curative polyurethane which includes a mixture of: from 0.2% to 0.6% of an organomercury catalyst, preferably 0.5%; from 10% to 17% petroleum hydrocarbon, preferably 15%; from 38% to 45% polyether polyols, preferably 43%; from 26% to 37% calcined kaolin, preferably 35%; and from 8% to 12% hydrophobic silica, preferably 6.5%.

The coating materials of either embodiment of the present invention are applied by a portable spray method which takes advantage of the near equal parts pre-polymer to curative ratios and the point of application mixing afforded by the spray application. The preferred method includes inspection of the surface to be coated to insure that the surface is free from dust, dirt, abrasive materials, oil, moisture, and any other condition that would interfere with the application process. Thereafter, the boundaries of the surface to be coated are masked with a suitable material, such as masking tape. Preformed, thin sheet metal aprons are useful in guarding the adjacent surface areas from coating overspray, if necessary. Any standard sized functional opening in the application surface for temporary coatings is likewise protected by applying convex polyvinyl molds or vinyl tape over such opening prior to the application of coating materials. Non-standard sized functional openings are protected using polyvinyl film or vinyl tape known in the art. When the ambient temperature is between the optimal range for the coating materials to be used, a releasing agent is applied to the surface to be coated for temporary applications.

Permanent coating applications do not require application of a releasing agent. Prepackaged equal amounts of the coating materials selected for use are loaded into the portable spray applicator which is fitted with a disposable mixing spray nozzle. The selected coating materials are then heated to a range of 40 degrees Fahrenheit to 120 degrees Fahrenheit. Once the coating materials reach this preheated temperature, they are applied to the surface to be coated by use of the portable spray applicator. For temporary coating applications, the vertical surface coating thickness is typically from 1/32 to 1/16 of an inch. For temporary coating applications, the horizontal surface coating surface is typically from 1/16 to 3/32 of an inch. For permanent coating applications, the application coating thickness is adjusted to suit each particular permanent application.

After the initial application of heated coating materials have been applied, the applied protective material coating can be adjusted by reapplying the protective material as necessary. The coated surface is allowed to cure, a period which takes between 30 to 45 seconds for the preferred embodiment. Other embodiments of the present invention provide cure time ranges between 10 minutes and 15 minutes, depending upon the ambient temperature, relative ratios of pre-polymer and curative, and atmospheric pressure. Once the protective coating has cured, the desired activities to be performed upon or around the protective coating and the protected surface can commence and be completed. If the protective coating is temporary, the protective coating and masking materials are quickly and easily removed upon completion of the desired activities by lifting a side loose from the protected surface and pulling the cured, protective coating away from the surface by hand. In this manner, the protective coating can be removed from standard bath tubs, shower stalls, shower pans, and the like, within seconds of separating a coating side from the protected surface. Similarly, the convex molded coatings and the underlying convex polyvinyl molds over any functional openings can be easily located and cut open or pulled off by tradesmen needing to access the opening for repairs, testing, connections, and the like, while the protective coating covers the protectively coated surface.

A critical advantage of the temporary protective coating of the preferred embodiment over the art is the durability of the removed surface coating of the present invention which can be reused repeatedly for several applications with identical surface geometries. This heightened durability feature of the present invention over the art makes it suitable for high volume, repetitive protective coating applications such as standard bathroom fixtures, bath tubs, shower stalls, shower pans, and the like, within the same dwelling or an array of dwellings with identical standards for these fixtures.

Another important advantage of the present invention over the art is the ability to quickly and easily apply the protective coating layer to the a wet releasing agent layer. The application temperature range for the releasing agent of the preferred embodiment of the present invention is 20 degrees to 120 degrees Fahrenheit. The preferred formulation of releasing agent leaves a slippery film on the substrate in even the highest ambient temperature range from 100 degrees to 120 degrees Fahrenheit. The preferred embodiment of the releasing agent of the present invention does not dry. This feature greatly lessens the time required to prepare and treat multiple surfaces of similar or identical geometries and/or topographies. For example, application times for standard bathroom fixtures, such as bath tubs, shower stalls, sinks, shower pans, and the like, can be as low as three to four minutes.

The method and materials of the present invention are demonstrably superior to sprayed latex based agents for the quick application to, and ease of removal from, protected surfaces. Sprayed latex agents require longer drying times and are not suitable for top-out water testing for bath tubs, shower stalls, shower pans, and the like, since under such environments latex floats to the water's surface re-exposing the previously protected surface to the hazards of the construction work site. The materials of the present invention stay in place while such water-testing is performed.

An additional step to provide a gripping surface for the protective layer is achieved by broadcasting regular sand granules, or the like, by hand across the protective layer surface just after it has been applied. In this fashion, the sand becomes part of the top of the hardened protective layer once it dries, affording traction to the protective layer top surface. Because of the durable nature of the protective layer of the present invention, this additional step of providing means for traction on the protective layer surface does not alter the effectiveness of the protective layer in guarding the protected surface from any intrusive damage resulting from work activity directly on the protective layer.

With respect to the above description then, it is to be realized that the optimum compositional relationships and methods for the invention, to include variations in size, materials, shape, form, function and manner of operation, assembly, manufacture, and use, are deemed readily apparent and obvious to one skilled in the art, and all equivalent relationships to described in the specification are intended to be encompassed by the present invention.

Therefore, the foregoing is considered as illustrative only of the principles of the invention. Additionally, since numerous modifications and changes will readily occur to those skilled in the art, it is not desired to limit the invention to the exact composition and methods described, and further, all suitable modifications and equivalents may be resorted to, falling within the scope of the invention.

We claim:

1. A method for protecting surfaces, comprising the steps of:

inspecting the application surface;

applying masking materials to protect the application surface boundary;

protecting any functional openings in the application surface using convex polyvinyl molding materials over the functional openings;

preheating a protective material to a temperature of 20 degrees Fahrenheit to 120 degrees Fahrenheit;

applying a wet releasing agent to the application surface once an ambient temperature range between 20 degrees Fahrenheit and 120 degrees Fahrenheit is met;

using an application means to apply the heated protective material to coat the application surface and wet releasing agent;

inspecting the protective material coating for consistency;

adjusting the protective material coating by reapplying the protective material as necessary;

allowing the protective material coating to cure;

performing work around the coated application surface;

completing the work around the coated application surface;

locating any functional openings in the coated application surface by the convex protrusion in the coated application surface;

opening the functional opening by cutting through or pulling off the convex protrusion in the application coating and convex polyvinyl mold thereunder;

performing any necessary work to the functional opening;

completing any necessary work to the functional opening;

removing any masking materials used to protect the application surface;

removing the intact remaining protective coating from the coated application surface; and reusing the intact protective coating for surfaces with an identical surface area and geometry as the previous application surface without applying any releasing agent or new protective coating materials.

2. The method of claim 1, wherein the protective coating material comprises:

between 52% to 75% by weight of a pre-polymer mixture; and between 25% to 52% by weight of a curative mixture.

3. The method of claim 2, wherein the application means comprises an adjustable dual pump sprayer further comprising a disposable spray nozzle tip wherein the pre-polymer mixture and the curative mixture are mixed at the disposable spray nozzle tip and atomized by compression to provide a four to five inch spray pattern.

4. The method of claim 3, further comprising applying the heated protective material to the application surface to a thickness of from 1/32 to 1/16 of an inch on vertical surfaces and to a thickness of 1/16 to 3/32 of an inch on horizontal surfaces.

5. The method of claim 3, further comprising applying means to provide a friction surface to the heated protective material before the protective material cures.

6. The method of claim 5, wherein the means to provide a friction surface to the heated protective material before the protective material cures further comprises applying sand to the heated protective material after it has been applied to the protected surface.

7. The method of claim 3, wherein the application means is portably housed in a manually carried assembly.

8. The method of claim 3, wherein the application means is portably housed in a manually positioned assembly.

9. The method of claim 3, wherein the application means is portably housed in an automotive vehicle.

10. The method of claim 3, wherein the pre-polymer mixture comprises:

from 35% to 75% polymeric diphenylmethane diisocyanate;

from 7% to 35% 4,4-diphenylmethane diisocyanate; and from 1% to 8% trischloropropyl phosphate.

11. The method of claim 3, wherein the curative mixture comprises:

from 2% to 76% hydroxl terminated poly (oxyalkylene) polyethers;

from 1% to 17.5% butanediol;

from 1% to 9% diethyltoluenediamine; and from 0.5% to 1% of organotin catalyst.

12. The method of claim 3, wherein the pre-polymer mixture comprises:

from 0.5% to 1% of toluene diisocyanate;

from 20% to 67% isocyanate terminated prepolymer;

from 4% to 10% diphenylmethane diisocyanate;

from 2% to 4.5% higher oligomers of MDI;

from 1% to 13% parafinic and naphthenic petroleum blend;

from 16% to 58% chlorinated hydrocarbon; and from 2% to 3% hydrophobic silica.

13. The method of claim 3, wherein the curative mixture comprises:

from 0.2% to 0.6% of an organomercury catalyst;

from 10% to 17% petroleum hydrocarbon;

from 38% to 45% polyether polyols;

from 26% to 37% calcined kaolin; and from 8% to 12% hydrophobic silica.

14. The method of claim 3, wherein the releasing agent comprises:

from 0.5% to 2% Stoddard solvent;

90% aliphatic hydrocarbon; and from 1% to 10% silicone blend.

15. The method of claim 3, wherein the releasing agent comprises:

90% aliphatic hydrocarbon; and

10% silicone blend.

16. The method of claim 3, wherein the releasing agent comprises:

1.5% Stoddard solvent;

90% aliphatic hydrocarbon; and 8.5% silicone blend.

17. The method of claim 3, wherein the pre-polymer mixture comprises:

70% polymeric diphenylmethane diisocyanate;

25% 4,4-diphenylmethane diisocyanate; and

5% trischloropropyl phosphate.

18. The method of claim 3, wherein the curative mixture comprises:

74% hydroxl terminated poly (oxyalkylene) polyethers;

17% butanediol;

8.1% diethyltoluenediamine; and 0.9% of organotin catalyst.

19. The method of claim 3, wherein the pre-polymer mixture comprises:

0.5% of toluene diisocyanate;

45% isocyanate terminated prepolymer;

7% diphenylmethane diisocyanate;

2% higher oligomers of MDI;

5% parafinic and naphthenic petroleum blend;

38% chlorinated hydrocarbon; and 2.5% hydrophobic silica.

20. The method of claim 3, wherein the curative mixture comprises:

0.5% of an organomercury catalyst;

15% petroleum hydrocarbon;

43% polyether polyols;

35% calcined kaolin; and 6.5% hydrophobic silica.

* * * * *